United States Patent [19]

Turvey

[11] Patent Number: 4,587,473
[45] Date of Patent: May 6, 1986

[54] STEPPER MOTOR CONTROL CIRCUIT

[75] Inventor: Simon Turvey, Solihull, England

[73] Assignee: Lucas Industries public limited company, Birmingham, England

[21] Appl. No.: 541,344

[22] PCT Filed: Feb. 2, 1983

[86] PCT No.: PCT/GB83/00027
§ 371 Date: Sep. 28, 1983
§ 102(e) Date: Sep. 28, 1983

[87] PCT Pub. No.: WO83/02695
PCT Pub. Date: Aug. 4, 1983

[30] Foreign Application Priority Data

Feb. 2, 1982 [GB] United Kingdom ............... 8202913

[51] Int. Cl.$^4$ .......................................... H02K 29/04
[52] U.S. Cl. ..................................... 318/696; 318/685
[58] Field of Search ................... 318/696, 685, 341

[56] References Cited

U.S. PATENT DOCUMENTS 3,909,693 9/1975 Yoshitake ............................ 318/696
4,255,693 3/1981 Keidl .................................. 318/685

FOREIGN PATENT DOCUMENTS 2361003 6/1979 Fed. Rep. of Germany.
2218693 9/1974 France.

OTHER PUBLICATIONS

Electronic Engineering, vol. 52, No. 636, Apr. 1980 (London, GB) E. Davies.
Stepping Motors and Their Microprocessor Controls; T. Kenjo; pp. 105-106; 138-139; 141-143.

Primary Examiner—William M. Shoop, Jr.
Assistant Examiner—Saul M. Bergmann
Attorney, Agent, or Firm—Stevens, Davis, Miller & Mosher

[57] ABSTRACT

A stepper motor control circuit includes a waveform generator circuit which produces two identical substantially stepless symmetrical waveforms (preferably a triangular configuration) at a frequency which can be varied on demand. Each waveform is used as a current demand signal for a pulse width modulator with a push-pull output stage controlling current in the motor windings. The pulse width modulator runs at a fixed frequency an order of magnitude higher than the maximum required stepping frequency. A current sensing resistor provides a feed-back signal which is fed back to input of the modulator to balance the demand signal.

15 Claims, 4 Drawing Figures

STEPPER MOTOR CONTROL CIRCUIT

BACKGROUND OF THE INVENTION

This invention relates to a stepper motor control circuit.

In known stepper motor control circuits, control of the current by means of a chopper operating at a frequency an order of magnitude higher than the maximum stepping rate has already been proposed. The circuits employed in the prior art have, however, been extremely complex and have usually employed output stages containing a large number of high power semiconductor components.

In addition, although the problem of shock loading of the rotor by the stepping pulses to it has been considered previously, no completely satisfactory solution has been proposed.

SUMMARY OF THE INVENTION

In accordance with one aspect of the invention a stepper motor control circuit comprises a waveform generator circuit arranged to generate a pair of substantially stepless symmetrical periodic waveforms of constant amplitude and of frequency determined by a variable step rate demand signal received thereby, the waveforms being 90° out of phase, a pair of pulse width modulation circuits arranged to drive the motor windings, each modulation circuit receiving one waveform as a current demand signal and a feedback signal related to the instantaneous current in the associated one of the motor windings.

The term "substantially stepless" is used herein to mean a waveform in which any step changes which occur are of very small magnitude compared with the amplitude of the waveform. Thus, for example, the waveform could be generated utilizing digital techniques, wherein the waveform amplitude is represented by a digital signal of at least 7 bits, so that a change in the digital signal represents a step in the wave form of only one one hundred and twenty eight of the waveform amplitude.

Preferably, each modulation circuit includes an output stage comprising a pair of semi-conductor switch elements which are transformer coupled to a driving stage of the modulation circuit. The output stage is preferably arranged as a push-pull stage operating between positive and negative power supply rails with the windings connected to an earth return through a current sensing resistor which provides the current feedback signal.

Preferably, the pulse width modulating circuits are arranged to operate at a fixed frequency at least an order of magnitude higher than the maximum stepping frequency.

BRIEF DESCRIPTION OF THE DRAWINGS

Four examples of the invention are shown in FIGS. 1 to 4 respectively of the accompanying drawings which are electrical circuit diagrams of the stepper motor control circuits.

DETAILED DESCRIPTION OF THE PREFERRED EMBODIMENTS

Figure 1:
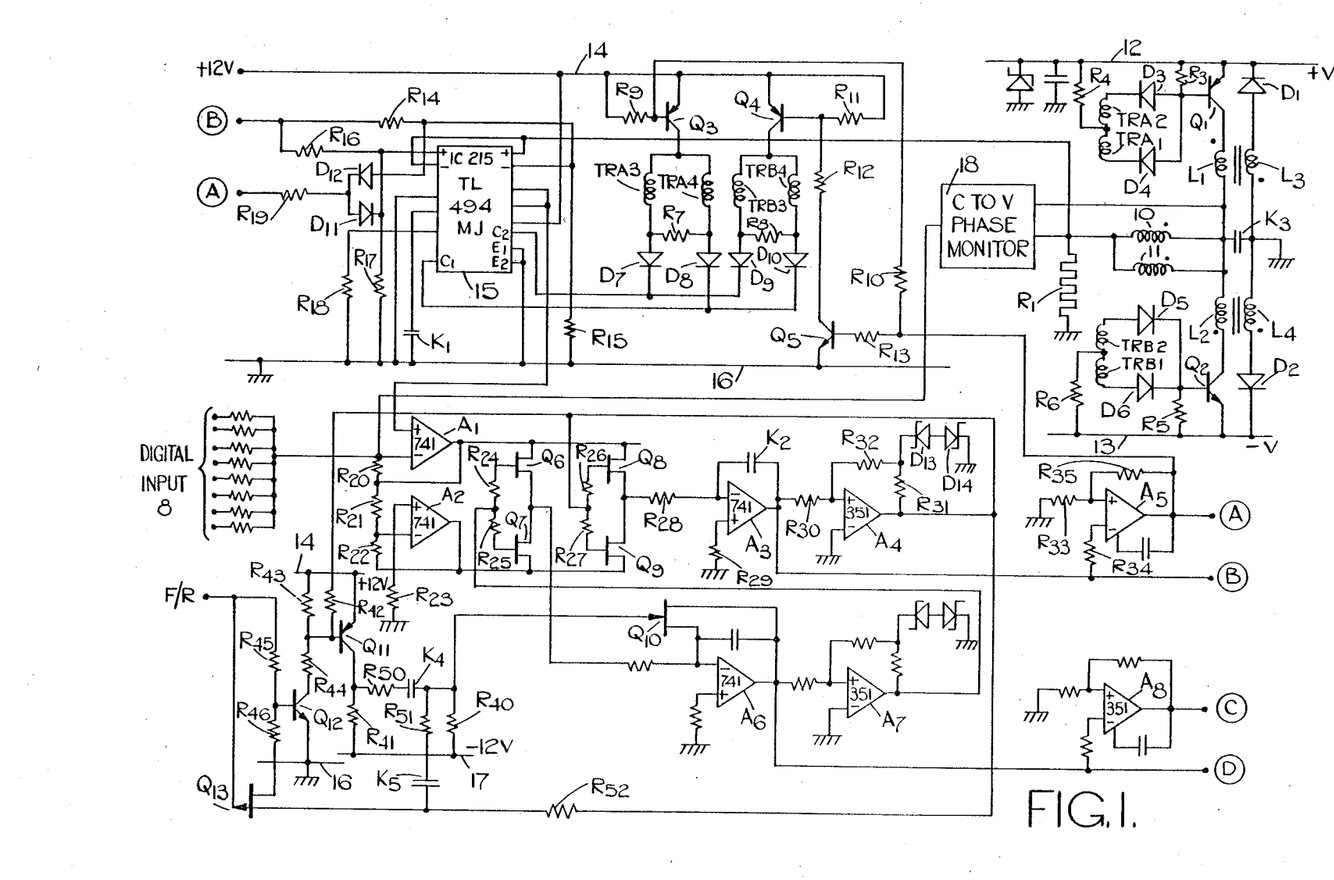

Referring firstly to FIG. 1, the stepper motor which is being controlled has four windings, two of which, 10 and 11 are shown in the accompanying drawing. These windings are connected in parallel with one another, via a current sensing resistor $R_1$ to ground at one end and to the junction of two inductors $L_1$, $L_2$ at the other end. The inductors $L_1$, $L_2$ are connected in series between the collector of a pnp transistor $Q_1$ and the collector of an npn transistor $Q_2$. Transistor $Q_1$ has its emitter connected to a positive power supply rail 12 and transistor $Q_2$ has its emitter connected to a negative power supply rail 13. The inductor $L_1$ is magnetically linked to a winding $L_3$ which is connected between ground and the anode of a diode $D_1$, the cathode of which is connected to rail 12. Similarly inductor $L_2$ is linked to a winding $L_4$ connected between ground and the anode of a diode $D_2$ which has its cathode connected to the rail 13. A capacitor $K_3$ is connected between the junction of inductors $L_1$ and $L_2$ and ground.

Transistor $Q_1$ is biased off by a resistor $R_3$ connecting its base to the rail 12. The base of transistor $Q_1$ is also connected to the anodes of two diodes $D_3$ and $D_4$ the cathodes of which are connected to opposite ends of two series connected secondary windings $TRA_1$ and $TRA_2$, the common point of which is connected via a resistor $R_4$ to the rail 12. Similarly, transistor $Q_2$ is biased off by a resistor $R_5$ connected between rail 13 and the base of transistor $Q_2$ which is also connected to the cathodes of two diodes $D_5$ and $D_6$ having their anodes connected to opposite ends of two series secondary windings $TRB_1$ and $TRB_2$, the common point of which is connected by a resistor $R_6$ to the rail 13.

The transformer of which the windings $TRA_1$ and $TRA_2$ are the secondaries has two primary windings $TRA_3$ and $TRA_4$ which are both connected at one end to the collector of a pnp transistor $Q_3$ the emitter of which is connected to a $+12$ V regulated supply rail 14. The other ends of windings $TRA_3$ and $TRA_4$ are connected to the anodes of two diodes $D_7$ and $D_8$ which have their cathodes connected respectively to the $C_2$ and $C_1$ output terminals of a switchmode pulse width modulation control integrated circuit 15 (type TL494MJ manufactured by Motorola Inc). A resistor $R_7$ interconnects the anodes of the diodes $D_7$ and $D_8$.

Similarly two primary windings $TRB_3$ and $TRB_4$ associated with windings $TRB_1$ and $TRB_2$ are connected at one end to the collector of a pnp transistor $Q_4$, the emitter of which is connected to the rail 14. Two diodes $D_9$ and $D_{10}$ connect the other ends of the windings $TRB_3$ and $TRB_4$ to the $C_2$ and $C_1$ terminals of i.c. 15. A resistor $R_8$ interconnects the anodes of diodes $D_9$ and $D_{10}$.

The transistors $Q_3$ and $Q_4$ are controlled by a signal at a terminal A so that when this signal is high transistor $Q_3$ is off and transistor $Q_4$ is on and when the signal is low transistor $Q_3$ is on and transistor $Q_4$ is off. To this end transistor $Q_3$ has its base connected by a resistor $R_9$ to the rail 14 and by a resistor $R_{10}$ to the terminal A. The transistor $Q_4$ has its base connected by a resistor $R_{11}$ to the rail 14 and by a resistor $R_{12}$ to the collector of an npn transistor $Q_5$ the emitter of which is connected to a ground rail 16 and the base of which is connected by a resistor $R_{13}$ to the terminal A.

The integrated circuit 15 has its C.L. sense inverting input terminal connected by a resistor $R_{14}$ to a terminal B and by a resistor $R_{15}$ to the rail 16. The error amplifier non-inverting input terminal is connected by a resistor $R_{16}$ to terminal B and by a resistor $R_{17}$ to rail 16. The error amplifier inverting input terminal and the C.L. sense amplifier non-inverting input terminal are both connected to the junction between the current sensing resistor $R_1$ and the windings 10 and 11. The compensation/PWM Comparator terminal is left open circuit and is not used. The dead time control terminal, the ground terminal and the $E_1$ and $E_2$ terminals are all connected to rail 16. A resistor $R_{18}$ connects the RT terminal to rail 16 and a capacitor $K_1$ connects the $C_T$ terminal to ground. These two components control the frequency of a clock oscillator incorporated in i.c. 15. The $V_{REF}$ and output control terminals of the i.c. 15 are connected together.

The error amplifier non-inverting input terminal of the i.c. 15 is also connected to the cathode of a diode $D_{11}$ and C.L. sense amplifier inverting input terminal is connected to the anode of a diode $D_{12}$. The anode of diode $D_{11}$ and the cathode of diode $D_{12}$ are connected together and also connected via a resistor 19 to the terminal A.

The terminals A and B are the output terminals of a waveform generation circuit which occupies the lower half of the drawing.

This waveform generation circuit receives an 8-bit digital word as an input, such word being derived in parallel form from a control computer (not shown), and representing the desired stepping frequency of the stepper motor. The respective bit inputs are connected by a simple d-to-a conversion network 8 to the inverting input of an operational amplifier $A_1$ which has a feedback resistor $R_{20}$ connected between its output and its inverting input. The non-inverting input of amplifier $A_1$ is connected to the reference voltage output of the i.c. 15.

The inverting input of an amplifier $A_2$ is connected by a resistor $R_{21}$ to the output of amplifier $A_1$ and by a resistor $R_{22}$ to the output of amplifier $A_2$. The non-inverting input of amplifier $A_2$ is grounded via a resistor $R_{23}$. Resistors $R_{21}$ and $R_{22}$ are of equal value so that amplifier $A_2$ acts as a unity gain inverting amplifier providing an output signal of the same magnitude as the output of amplifier $A_1$, but of opposite sign.

Two pairs of complementary f.e.t.s. $Q_6$ and $Q_7$, $Q_8$ and $Q_9$ are each connected in series between the outputs of amplifiers $A_1$ and $A_2$ the gates of f.e.t.s. $Q_6$ and $Q_7$ being connected together by two resistors $R_{24}$ and $R_{25}$ in series and the gates of f.e.t.s. $Q_8$ and $Q_9$ being connected together by two resistors $R_{26}$ and $R_{27}$. The voltage at the junctions of each of these pair of resistors determines which one of each pair of f.e.t.s. is conductive.

The junction between transistors $Q_8$ and $Q_9$ is connected via a resistor $R_{28}$ to the inverting input of an operational amplifier $A_3$ which has its non-inverting input grounded by a resistor $R_{29}$ and its output connected by a feedback capacitor $K_2$ to its inverting input. The amplifier $A_3$ operates as an integrator, the output of which ramps linearly at a rate determined by the output voltage of amplifiers $A_1$ and in a sense determined by which of the two f.e.t.s. $Q_8$ and $Q_9$ is conductive.

The output of amplifier $A_3$ is connected by a resistor $R_{30}$ to the non-inverting input of a comparator $A_4$ which has its inverting input grounded. The output of comparator $A_4$ is connected by two resistors $R_{31}$ and $R_{32}$ in series to its inverting input, the junction of these resistors being connected by two oppositely connected zener diodes $D_{13}$, $D_{14}$ to ground. The output of amplifier $A_4$ is connected to the junction of resistors $R_{26}$ and $R_{27}$ so as to control the f.e.t.s. $Q_8$ and $Q_9$.

The amplifier $A_3$ and the comparator $A_4$ operate together as a triangular waveform generator with the output of amplifier $A_3$ swinging between two fixed positive and negative voltage levels set by the zener diodes $D_{13}$ and $D_{14}$. The frequency of the waveform is directly proportional to the voltage. The maximum value of the stepping frequency is an order of magnitude less than the frequency of the chopper.

The output of amplifier $A_3$ is connected to terminal B and is also connected by a resistor $R_{34}$ to the inverting input of a comparator $A_5$, the non-inverting input of which is connected to ground by a resistor $R_{33}$. The output of comparator $A_5$ is connected to terminal A and is also connected by a relatively high ohmic value resistor $R_{35}$ to its non-inverting input. This ensures sharp switching of the comparator between its two output states, the comparator $A_5$ operating as a zero-crossing detector.

Assuming that the zener diodes $D_{13}$ and $D_{14}$ have breakdown voltages of 6.8 V, the output of amplifier $A_3$ ramps between $-7.5$ V and $+7.5$ V. The output of comparator $A_5$ is $-12$ V when the $A_3$ output is positive and $+12$ V when it is negative. The effect of resistors $R_{14}$ to $R_{17}$ and $R_{19}$ and diodes $D_{11}$ and $D_{12}$ is to determine which one of inputs of the i.c. 15 receives a real demand signal in the range of 0 to $\pm 75$ mV and which one receives a false signal, the magnitude of which is increase by current flowing through resistor $R_{19}$.

Considering a cycle of operation which commences when the output of amplifier $A_3$ is at $-7.5$ V and rising, the signal at terminal B will be $-7.5$ V and that at terminal A, $+12$ V. As a result the signal at the inverting input of the c.l. sense amplifier of i.c. 15 will be $-75$ mV whereas that at the non-inverting input of the error amplifier will be positive. The internal "high-wins" diode gate in i.c. 15 ensures that only the error signal corresponding to the difference between the $-75$ mV input signal and the voltage across $R_1$ has any controlling effect. The i.c. 15 operates to route fixed frequency variable duration pulse through the $E_1C_1$ and $E_2C_2$ path within the i.c. 15. Since transistor $Q_4$ is on as a result of the output of comparator $A_5$ being $+12$ V, transformer $TR_B$ is pulsed so that transistor $Q_2$ is pulsed on and off appropriately. The current level in the winding 10 and 11 is regulated in this way to make the voltage across resistor $R_1$ $-75$ mV.

As the output of amplifier $A_3$ rises the current in resistor $R_1$ is progressively reduced. When the output of amplifier $A_3$ crosses zero, the output of comparator $A_5$ changes to $-12$ V so that the signal at the inverting input of the C.L. sense amplifier falls instantaneously to a relatively large negative value whereas that at the non-inverting input of the i.c. error amplifier falls to 0V. At the same time transistor $Q_4$ switches off and transistor $Q_3$ switches on to cause the pulses from i.c. to control $Q_1$ instead of $Q_2$ and the forward current passed increases as the output of amplifier $A_3$ becomes increasingly positive. The inductors $L_1$ and $L_2$ serve to limit the current rise should transistors $Q_1$ and $Q_2$ become conductive simultaneously for a period during the zero crossing switch-over. Furthermore the windings $L_3$, $L_4$, which make up 1:1 transformers (at the switching frequency) with the respective inductors $L_1$ and $L_2$, the diodes $D_1$, $D_2$ and the capacitor $K_3$ ensure that motor current is maintained whilst either $Q_1$ or $Q_2$ is switched off, and is "dumped" in the appropriate supply rail 12 or 13 even at low stepping frequency.

Similarly the current in windings 10 and 11 is controlled during the period when the output of amplifier $A_3$ is ramping downwardly.

The stepper motor also includes a second pair of windings (not shown) which are to be driven with a current waveform 90° out of phase with that in the windings 10 and 11 and either lagging or leading depending on the required direction of drive. To this end a second integrating amplifier $A_6$, and further comparators $A_7$ and $A_8$ are provided. Amplifier $A_6$ and comparator $A_8$ provide signals to terminals D and C which are inputs to another circuit exactly the same as that shown in the upper half of the drawing as described above, which circuit drives the other two motor windings. Amplifier $A_6$ integrates the signal at the output of f.e.t.s. $Q_6$ and $Q_7$ which are controlled by the signal at the output of comparator $A_7$.

To ensure that the two waveform generator circuits run in the required phase relationship, an f.e.t. $Q_{10}$ is connected between the output and inverting input terminals of amplifier $A_6$ to ensure that the integrating capacitor associated therewith is held discharged at certain times.

The gate of transistor $Q_{10}$ is connected by a resistor $R_{40}$ to a $-12$ V rail 17. The gate of transistor $Q_{10}$ is also connected via a capacitor $K_4$ and a resistor $R_{50}$ in series to the collector of a pnp transistor $Q_{11}$ which has its emitter connected to the rail 14 and its collector connected by a resistor $R_{41}$ to the rail 17. The base of transistor $Q_{11}$ is connected by a resistor $R_{42}$ to the output terminal of amplifier $A_4$ and also connected to the junction of two resistors $R_{43}$, $R_{44}$ in series between the rail 14 and the collector of an npn transistor $Q_{12}$. The emitter of the transistor $Q_{12}$ is grounded and its base is connected to the junction of two resistors $R_{45}$, $R_{46}$ in series between a FWD/RVSE terminal and ground. Further the gate of transistor $Q_{10}$ is connected by a resistor $R_{51}$ and a capacitor $K_5$ in series with the drain-source of a field effect transistor $Q_{13}$ to ground. The gate of transistor $Q_{13}$ is connected directly to the FWD/RVSE terminal. A resistor $R_{52}$ connects the drain of transistor $Q_{13}$ to the output of amplifier $A_4$.

For forward running the start of the triangular wave at D should coincide with the leading edge of the square wave from amplifier $A_4$, whereas for reverse running it should coincide with the trailing edge of that square wave. The square wave at the output of amplifier $A_4$ is inverted by transistor $Q_{11}$. When the signal at the FWD/RVSE terminal is high $Q_{11}$ is turned on continuously, thereby preventing it from operating as an inverter, but the f.e.t. $Q_{13}$ is off. Thus the positive going edges of the square wave output of amplifier $A_4$ are differentiated by capacitor $K_5$ and provide positive going spikes coincident with these edges to turn on f.e.t. $Q_{10}$. The negative spikes created at the trailing edges of the square waves have no effect. When the signal at the FWD/RVSE terminal is low f.e.t. $Q_{13}$ is on and therefore grounds the pulses arriving via resistor $R_{52}$. Transistor $Q_{11}$ acts as an inverter and the rising edges of the inverted waveform create positive spikes to turn on f.e.t. $Q_{10}$ in synchronism with the trailing edges of the square waves from amplifier $A_4$.

The circuit described ensures that no shock loads are applied to the rotor of the motor. The use of a chopper current control to control current with a triangular waveform or other stepless symmetrical waveform overcomes the problem in known stepper motor controls of shock excited "pendulum" type vibration of the rotor. Thus no pull-in and drop-out problems arise from rotor resonances being excited. The rotor can be stopped in any desired position between the normal stable positions by maintaining the current in the motor windings at the level at which it was flowing at the moment of coming to rest. Controlled acceleration and deceleration of the motor under the control of the computer are easily achieved.

The use of transformer coupling to the output transistors $Q_1$ and $Q_2$ and the employment of a three rail supply enable the output stage to be made very simple. Only two high power transistors are needed and two diodes $D_1$ and $D_2$ provide the necessary current recirculation paths, with winding current continuing to flow through the sensing resistor $R_1$.

The integrated circuit 15 employed, although intended for use in power supply regulation, proves to be entirely suitable for stepper motor control and makes the chopper drive circuit extremely simple.

The circuit may also include a current/voltage phase monitor 18 arranged to provide additional current into the summing junction of amplifier $A_1$ when the current in resistor $R_1$ is out of phase with the voltage at the junction of inductors $L_1$ and $L_2$. In this way the stepping frequency is reduced if the motor is overloaded.

Figure 2:
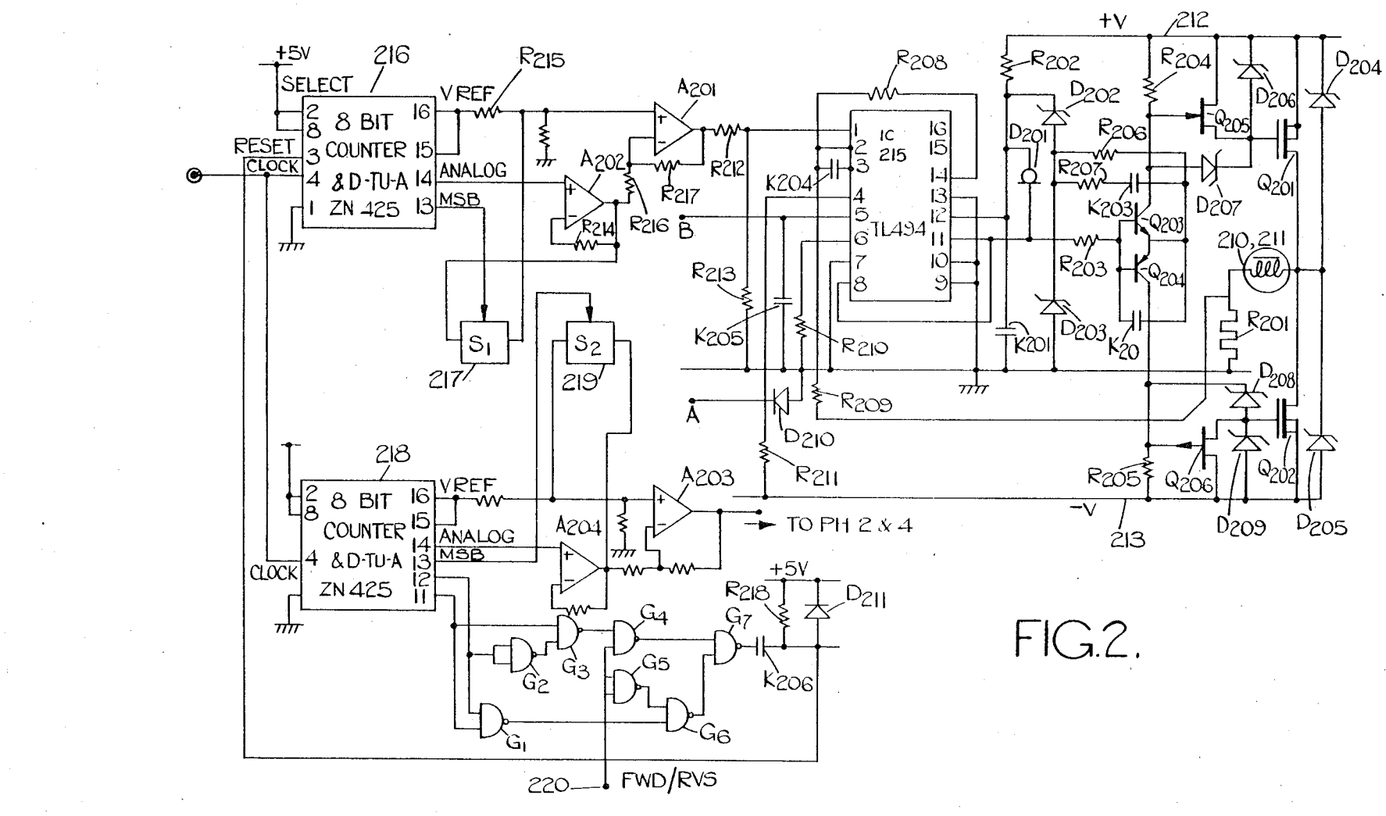

Turning now to FIG. 2, the phase windings 210, 211 of the motor are represented by a single inductor. The current in these windings is controlled by a pair of complementary FETs, $Q_{201}$ and $Q_{202}$ connected in series between the power supply rails 212, 213. The windings 210, 211 are connected at one end to the common point of these FETs and at the other end via a current sensing resistor $R_{201}$ to ground. The FETs $Q_{201}$ and $Q_{202}$ are again driven by a PWM modulator i.c. 215 (TL494), but in this case no isolating transformers are needed. The $C_1$ and $C_2$ outputs of this i.c. are connected together (these are open collector outputs), and are connected by a constant current diode $D_{201}$ as load to a zener regulated supply (resistor $R_{202}$, zener diodes $D_{202}$ and $D_{203}$ in series, and a smoothing capacitor $K_{201}$ connected across the zener diodes) which is connected between the rail 212 and ground, and also connected by a resistor $R_{203}$ to the bases of two complementary transistors $Q_{203}$ and $Q_{204}$. These transistors have their emitters connected together and have their collectors connected by respective resistors $R_{204}$, $R_{205}$ to the rails 212, 213. A pair of complementary FETs $Q_{205}$, $Q_{206}$ which act as drivers for the FETs $Q_{201}$, $Q_{202}$ respectively have their gates connected to respective ones of the collector of transistors $Q_{203}$, $Q_{204}$ and have their drain-source paths connecting the gates of respective ones of the FETs $Q_{201}$, $Q_{202}$ to the rails 212, 213. The output of FETs $Q_{201}$, $Q_{202}$ are protected by two zener diodes $D_{204}$, $D_{205}$ and each FET $Q_{205}$, $Q_{206}$ is protected by two zener diodes $D_{206}$, $D_{207}$ and $D_{208}$, $D_{209}$ connected as shown in FIG. 2. A capacitor $K_{202}$ connects the emitter of transistors $Q_{203}$, $Q_{204}$ to the bases thereof to provide a deadband rapid in the switching on and off of these transistors and, therefore, of the driver FETs $Q_{205}$, $Q_{206}$ and the output FETs $Q_{201}$, $Q_{202}$. The emitter of the transistors $Q_{203}$, $Q_{204}$ are connected by a resistor $R_{206}$ in parallel with the series combination of a resistor $R_{207}$ and a capacitor $K_{203}$ to the common point of zener diodes $D_{202}$, $D_{203}$, so as to provide fast turn-on following the deadband delay introduced by capacitor $K_{202}$.

The V REF output of the i.c. 215 is connected by a resistor $R_{208}$ to the error amplifier inverting input thereof, such input being also connected by a capacitor $K_{204}$ to the error amplifier output of the i.c. 215 and by a resistor $R_{209}$ to the non-earthy side of the current sensing resistor $R_{201}$ so as to provide motor current feedback to the i.c. 215. The $G_T$ and $R_T$ terminals of the i.c. 215 are grounded by a capacitor $K_{205}$ and a resistor $R_{210}$ respectively. The DEAD TIME CONTROL input of i.c. 215 is connected to a terminal A and is also connected by a resistor $R_{211}$ to rail 213 and by a diode $D_{210}$ to ground.

The non-inverting input of the error amplifier of the i.c. 215 is connected by a resistor $R_{212}$ to the output of an operational amplifier $A_{201}$ and by resistor $R_{213}$ to ground. Amplifier $A_{201}$ operates in conjunction with an operational amplifier $A_{202}$ an integrated 8-bit counter and digital-to-analog converter 216 (Ferranti ZN425), and a CMOS anolog bilateral switch 217 (¼ DG211) as a triangular waveform generator which provides a current demand signal to the pulse width modulator based on i.c. 215.

The ANALOG OUTPUT terminal of the converter 216 is connected directly to the non-inverting input of amplifier $A_{202}$ which has its output connected by a resistor $R_{214}$ to its inverting inpout so that it operates as a unity gain voltage follower. The MSB output of converter 216 is connected to the control terminal of switch 217 and the signal path of the switch 217 is connected between the output of amplifier $A_{202}$ and the non-inverting input of amplifier $A_{201}$. The V-REF output of converter 216 is connected directly to the V-REF input thereof and is also connected by a resistor $R_{215}$ to the non-inverting input of amplifier $A_{201}$. The output of amplifier $A_{202}$ is connected by a resistor $R_{216}$ to the inverting input of amplifier $A_{201}$ and a resistor $R_{217}$ of the same value as resistor $R_{216}$ is connected between the output of amplifier $A201$ and its inverting input.

The CLOCK input of the converter 216 is connected to a suitable source of clock pulses, the frequency of which determines the stepping rate of the motor. The amplifier $A_{201}$ operates as a unity gain inverting amplifier or as a voltage follower according to whether the switch 217 is conductive or not. When the switch 217 is conductive, which occurs when the MSB output of converter 216 is high, ie. when the analog output is at a voltage higher than half the reference voltage output by V REF terminal of converter 216, the output of amplifier $A_{202}$ is connected directly to the non-inverting input of amplifier $A_{201}$ which acts as a unit gain voltage follower. Thus, as the count in the counter of converter 216 increases, the output of amplifier $A_{201}$ increases linearly. When the switch 217 is non-conductive, the amplifier $A_{201}$ as a unity gain inverting amplifier so that the output of amplifier $A_{201}$ decreases linearly as the count in the counter of converter 216 increases. Since this counter operates cyclically, the ANALOG output of converter 216, provides repeated saw tooth waveform, which the amplifier $A_{201}$ and switch 217 connect into a symmetrical substantially stepless triangular waveform.

A second counter converter 218, a second switch 219 and two amplifiers $A_{203}$ and $A_{204}$ are connected similarly to provide a second triangular waveform, which is used for providing a current demand signal to another pulse width modulation circuit (not shown) controlling the other two phase windings of the motor.

The relative phase of the two waveform generators is controlled by a logic, circuit which receives inputs from the second and third MSB outputs of the converter 218 and provides reset pulses periodically to the converter 216. This logic circuit comprises seven NAND gates $G_1$, to $G_7$. Gate $G_1$ has its inputs connected respectively to the second and third MSB outputs of converter 218, whereas gate $G_3$ has one input connected to the third MSB output and the other connected to the output of gate $G_2$ both inputs of which are connected to the second M5B output to operate as a logic inverter. Gate $G_4$ has one input from the output of gate $G_3$ and one from a forward/reverse input terminal 220. Gate $G_6$ has one input connected to the output of gate $G_1$ and the other connected to the output of gate $G_5$, both inputs of which are connected to the terminal 220. Gate $G_7$ has one input from gate $G_4$ and one from gate $G_6$ and drives a differentiator comprising a capacitor $K_{206}$ a resistor $R_{218}$ and a diode $D_{211}$, the output of this differentiator is connected to RESET terminal of converter 216. When the signal on terminal 220 is low (FORWARD) the output of gate $G_7$ is in phase with the output of gate $G_1$, i.e. it is high except when both of the second and third M5B outputs are high. A reset pulse is delivered by the differentiator when the output of gate $G_7$ goes low, thereby resetting the converter 216 halfway through the ascending flank of the waveform of generators 218, 219, $A_{203}$, $A_{204}$. Similarly, when the signal at terminal 220 is high converter 216 is reset half way through the descending flank of the other waveform.

A simple digital waveform generator as described above has the advantage that the "integrators" constituted by the counter/converter 216 218 have no tendency to drift.

At very low stepping speed the clock can be directly connected to a control computer, thereby enabling very accurate control of the motor shaft position (which is fed back to the computer) down to one sixty-fourth of a step. At high stepping rates a digit-to-frequency converter or a rate multiplier can be used to give accurate speed and displacement control.

Figure 3:
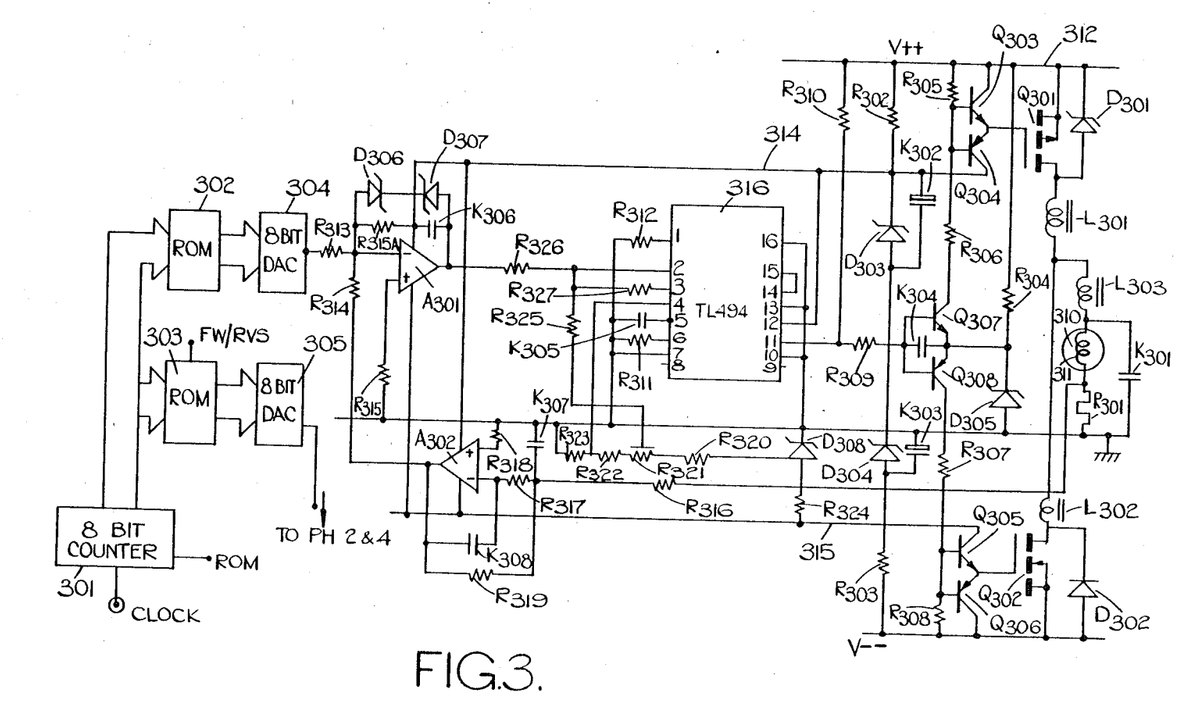

Turning now to FIG. 3 a different pulse width modulation circuit (but still using a TL494 integrated circuit) and a different digital waveform generator are employed. The waveform generator simply uses a counter 301 the output of which is fed to two ROMs 302 and 303 which store waveform data and provide outputs to two digital-to-analog converters 304, 305. One ROM 303 can store two sets of waveform data to enable the necessary advance/retard of the waveforms to be obtained for forward and reverse operation. Converter 304 provides a current demand waveform for the pulse width modulator which drives the phase windings 310, 311 of the motor, whereas converter 305 provides a waveform for the other modulator (not shown) for the other phase windings (not shown).

The pulse width modulator shown in FIG. 3 utilizes two HEXFETs $Q_{301}$ and $Q_{302}$ connected in series with two series inductors $L_{301}$, $L_{302}$ between the supply rails 312 and 313. Protective diodes $D_{301}$ and $D_{302}$ are connected across the two HEXFETs $Q_{301}$ and $Q_{302}$ respectively. The junction of the two inductors $L_{301}$, $L_{302}$ (which are provided to limit the rate of current rise should the conduction periods of the two HEXFETs overlap) is connected by another inductor $L_{303}$ to one end of windings 310, 311, the other end being grounded via a current sensing resistor $R_{301}$. The gate of HEXFET 301 is connected to the emitters of a first pair of complementary driver transistors $Q_{303}$, $Q_{304}$, the gate of HEXFET $Q_{302}$ being connected to the emitter of another pair of complementary driver transistors $Q_{305}$, $Q_{306}$. The collectors of the transistors $Q_{303}$, $Q_{304}$, are connected respectively to the +28 V rail 312 and to a −12 V rail 314. Similarly the collectors of transistor $Q_{305}$, $Q_{306}$ are connected to a −12 V rail 315 and the −28 V rail 313. The +12 V, −12 V rails 314, 315 are zener stabilised, utilizing zener diodes $D_{303}$, $D_{304}$, feed resistors $R_{302}$, $R_{303}$ and smoothing capacitors $K_{302}$, $K_{303}$ respectively. The transistors $Q_{303}$, $Q_{304}$, $Q_{305}$ and $Q_{306}$ are controlled by another complementary transistor pair $Q_{307}$, $Q_{308}$ which have their emitters connected to a 4.7 V supply provided by a zener diode $D_{305}$ in series with a resistor $R_{304}$ between rail 312 and ground. The collector of transistor $Q_{307}$ (npn) is connected by two resistors $R_{305}$, $R_{306}$ in series to rail 312 with the junction of these resistors connected to the bases of the transistors $Q_{303}$, $Q_{304}$. Similarly two resistors $R_{307}$, $R_{308}$ in series connect the collector of transistor $Q_{308}$ to the rail 313 and the junction of these resistors is connected to the bases of transistors $Q_{305}$, $Q_{306}$. The bases of the transistors $Q_{307}$, $Q_{308}$ are connected together and a capacitor $K_{304}$ connects them to the emitters of these transistors. Furthermore a resistor $R_{309}$ connects the base of transistor $Q_{307}$, $Q_{308}$ to the $C_2$ output terminal of i.c. 316, which terminal is connected to rail 312 by a resistor $R_{310}$. The "current limit" amplifier of i.c. 316 is not used, its non-inverting input being grounded and its inverting input being connected to the VREF output thereof. The OUTPUT CONTROL and $E_2$ terminals are also grounded. The chopping frequency of the i.c. 316 is set at about 100 KHz by a resistor $R_{311}$ and a capacitor $K_{305}$ connecting the $R_T$ and $C_T$ terminals of i.c. 316 to ground. The error amplifier non-inverting input is grounded by a resistor $R_{312}$.

In the example shown in FIG. 3 the error amplifier of the i.c. 316 is used merely as an inverting amplifier stage operating on the signal from a operational amplifier $A_{301}$. This receives at its inverting input the current demand signal from the converter 304 via a resistor $R_{313}$ and a current feedback signal from an operational amplifier $A_{302}$ via a resistor $R_{314}$. The non-inverting input of amplifier $A_{301}$ is grounded via a resistor $R_{315}$. Local feedback around amplifier $A_{301}$ is provided by a capacitor $K_{306}$ and a resistor $R_{315A}$ in series between the output and inverting input terminals of amplifier $A_{301}$, the voltage at the output of amplifier $A_{301}$ being limited by two relatively reversed zener diodes $D_{306}$, $D_{307}$ in series between the inverting input and the output terminals thereof.

Amplifier $A_{302}$ acts as a low pass filter operating to filter out the 100 KHz component of the voltage signal generated in the resistor $R_{301}$ when current is flowing in windings 310, 311. Resistor $R_{301}$ is connected by resistors $R_{316}$, $R_{317}$ in series to the inverting input of amplifier $A_{302}$, the junction of these resistors being connected to ground by a capacitor $K_{307}$. The non-inverting input of amplifier $A_{302}$ is grounded via a resistor $R_{318}$ and feedback around amplifier $A_{302}$ is provided by a capacitor $K_{308}$ connected between the output terminal and the inverting input terminal, and by a resistor $R_{319}$ connected between the output terminal and the junction of resistors $R_{316}$ and $R_{317}$.

The DEAD TIME CONTROL terminal of i.c. 316 is biassed to a small negative voltage and the inverting input of the error amplifier of i.c. 316 is biased to an adjustable negative voltage by means of a resistor chain $R_{320}$, $R_{321}$, $R_{322}$, $R_{323}$ connected between the anode of a 4.7 V zener diode $D_{308}$ and ground. The cathode of zener diode $D_{308}$ is grounded and its anode is connected by a resistor $R_{324}$ to the −12 V rail 315. The resistor $R_{321}$ is, in fact, a preset potentiometer and has its slider connected by a resistor $R_{325}$ to the inverting input of the error amplifier of i.c. 316. The junction of resistors $R_{322}$ and $R_{323}$ is connected to the DEAD TIME CONTROL input. The error amplifier receives its input from operational amplifier $A_{301}$ via a resistor $R_{326}$ and local negative feedback is provided by a resistor $R_{327}$.

In the example shown in FIG. 3, the pulse width modulator operates by switching HEXFETs $Q_{301}$ and $Q_{302}$ on alternately at the chopping frequency referred to and thereby maintaining the actual average current in the windings 310, 311 at the desired level set by converter 304.

Figure 4:
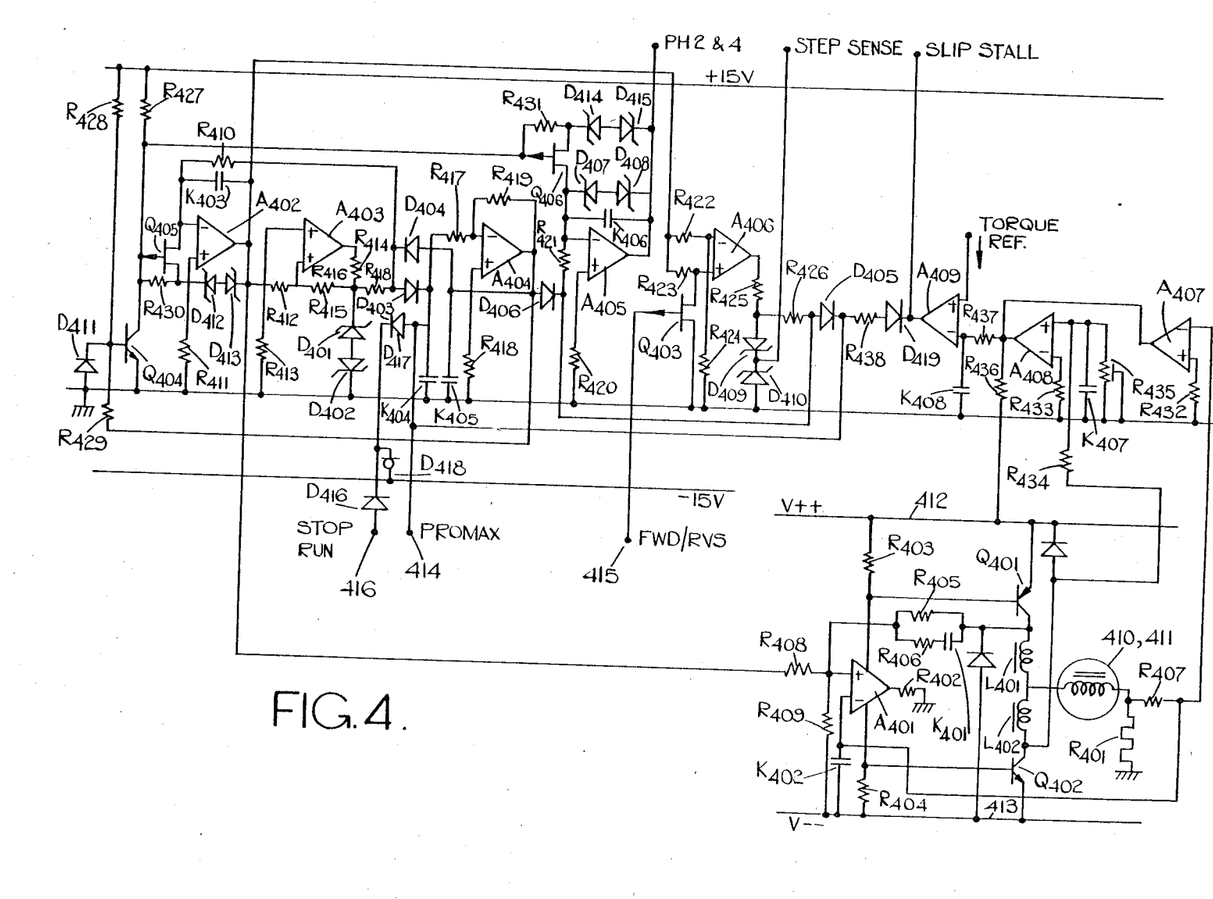

The arrangement shown in FIG. 4 includes an analog waveform generator driving a simple bipolar transistor pulse width modulator.

The windings 410, 411 are connected at one end to the junction of two inductors $L_{401}$, $L_{402}$ connected in series between the collectors of two output transistors $Q_{401}$, $Q_{402}$, and at the other end via a current sensing resistor $R_{401}$ to ground. Transistor $Q_{401}$ is a pnp transistor and has its emitter connected to the positive supply rail 412, whereas transistor $Q_{402}$ is an npn transistor which has its emitter connected to the negative supply rail 413. The transistor $Q_{401}$, $Q_{402}$ are controlled by an operational amplifier $A_{401}$ which has a load resistor $R_{402}$ connected between its output terminal and ground. The positive and negative supply terminals of amplifier $A_{401}$ are connected to rails 412 and 413 by respective resistors $R_{403}$, $R_{404}$ and are also connected respectively to the bases of the transistors $Q_{401}$ and $Q_{402}$. Positive feedback is provided via a resistor $R_{405}$, in parallel with the series combination of a resistor $R_{406}$ and a capacitor $K_{401}$, between the collector of the transistor $Q_{401}$ and the non-inverting input of amplifier $A_{401}$. Negative feedback is provided by a resistor $R_{407}$ connected between resistor $R_{401}$ and the inverting input of amplifier $A_{401}$, a capacitor $K_{402}$ connecting this inverting input to the rail 413. A current demand signal is applied to the non-inverting input of amplifier $A_{401}$ via a resistor $R_{408}$ and a resistor $R_{409}$ connects this non-inverting input to the rail 413.

The amplifier $A_{401}$ in fact operates as a voltage comparator. When the voltage at the inverting input is higher than that at the non-inverting input current flows from ground through the resistor $R_{402}$ into the output of amplifier $A_{401}$ and hence through resistor $R_{404}$ to rail 413. Thus transistor $Q_{402}$ turns on. When the voltage at the inverting input is lower than that at the non-inverting input, transistor $Q_{403}$ turns on. Resistor $R_{405}$ changes the voltage at non-inverting input of amplifier $A_{401}$ to cause the amplifier $A_{401}$ to operate in the manner of a Schmidt trigger with upper and lower thresholds linearly dependent on the current demand signal. Current feedback via resistor $R_{407}$ shunted by capacitor $K_{402}$ makes the whole circuit into an oscillator and the inductive load ensures that the charge/discharge rates of capacitor $K_{402}$ depend on the average current flow in the load so that pulse-width modulation is obtained to regulate the current to the demand value.

The current demand signal is derived from an operational amplifier $A_{402}$ connected as an active integrator having an input resistor $R_{410}$ and a feedback capacitor $K_{403}$. A resistor $R_{411}$ connects the non-inverting input of amplifier $A_{402}$ to ground. The output of amplifier $A_{402}$ is connected by a resistor $R_{412}$ to the non-inverting input of an amplifier $A_{403}$ the inverting input of which is connected by a resistor $R_{413}$ to ground. Two resistors $R_{414}$ and $R_{415}$ in series connect the output of amplifier $A_{403}$ to its non-inverting input, the junction of such resistors being connected to ground by two back-toback zener diodes $D_{401}$ and $D_{402}$ in series. The junction of resistors $R_{414}$ and $R_{415}$ is also connected by a resistor $R_{416}$ to the integrator input resistor $R_{410}$. Two capacitors $K_{404}$ and $K_{405}$ are connected by oppositely poled diodes $D_{403}$, $D_{404}$ to the junction of resistors $R_{416}$ and $R_{410}$, such capacitors being grounded. An amplifier $A_{404}$ is connected to ensure that the voltages on capacitors $K_{404}$ and $K_{405}$ are equal and opposite. To this end amplifier $A_{404}$ has its inverting input connected by a resistor $R_{417}$ to the capacitor $K_{404}$ and its non-inverting input grounded via a resistor $R_{418}$. A feedback resistor $R_{419}$ connects the output of amplifier $A_{404}$ to its inverting input to provide unity gain inverting operation and the output of amplifier $A_{404}$ is connected to capacitor $K_{405}$.

It will be appreciated that the amplifier $A_{403}$ operates as a Schmidt trigger circuit determining the polarity of the signal applied via the resistor $R_{410}$ to the integrating amplifier $A_{402}$. However, the magnitude of the signal applied to the integrator depends on the voltage for the time being stored on the capacitors $K_{404}$, $K_{405}$. The circuit thus far described therefore operates as a triangular waveform generator, the amplitude of the waveform being fixed, but the frequency being inversely proportional to the voltage stored on the capacitors $K_{404}$, $K_{405}$.

A second integrator is provided for generating an identical waveform, suitably phase-shifted, for the other phase windings (not shown) of the motor. This second integrator includes an operational amplifier $A_{405}$ which has its non-inverting input grounded via a resistor $R_{420}$. An input resistor $R_{421}$ for this integrator is connected at one end to the anode of a diode $D_{405}$, which has its cathode connected to the capacitor $K_{404}$, and to the cathode of a diode $D_{406}$ which has its anode connected to the capacitor $K_{405}$, and at the other end to the inverting input of amplifier $A_{405}$. A feedback capacitor $K_{406}$ is connected between the output and non-inverting input terminals of the amplifier $A_{405}$. Two zener diodes $D_{407}$, $D_{408}$ connected back-to-back are also connected between the output and inverting input terminals of amplifier $A_{405}$.

The polarity of the signal integrated by amplifier $A_{405}$ is determined by an operational amplifier $A_{406}$ which is connected to operate as a zero-crossing detector. The two inputs of this amplifier $A_{406}$ are connected by respective resistors $R_{422}$ and $R_{423}$ to the output of amplifier $A_{402}$. The inverting input is connected by a resistor $R_{424}$ to ground whereas the non-inverting input is connected by the drain-source path of an FET $Q_{403}$ to ground. The amplifier $A_{406}$ operates in inverting or non-inverting mode according to whether the FET $Q_{403}$ is conductive or not. The gate of FET $Q_{403}$ is connected to a FWD/RVS input terminal 415, the signal at which thus determines the mode of operation of the amplifier $A_{406}$. The output terminal of amplifier $A_{406}$ is connected by a resistor $R_{425}$ to the anode of a zener diode $D_{409}$, which is connected back-to-back with a zener diode $D_{410}$ having its anode connected to ground. A resistor $R_{426}$ connects the anode of zener diode $D_{409}$ to the anodes of the diode $D_{405}$.

Each of the integrators $A_{402}$ and $A_{405}$ has a resetting circuit associated with it and these are controlled by a single npn transistor $Q_{404}$ with its emitter grounded and its collector connected to the +15 V rail by a resistor $R_{427}$. The base of this transistor is connected by a resistor $R_{428}$ to the +15 V rail, by a resistor $R_{429}$ to the capacitor $K_{405}$ and by a diode $D_{411}$ to ground, the cathode of diode $D_{411}$ being connected to the base of transistor $Q_{404}$. The resetting circuit associated with amplifier $A_{402}$ includes an FET $Q_{405}$ with its gate connected to the collector of transistor $Q_{404}$, its drain connected by a resistor $R_{430}$ to the collector of transistor $Q_{404}$ and by two back-to-back zener diodes $D_{412}$ and $D_{413}$ to the output of amplifier $A_{402}$ and its source connected to the inverting input of amplifier $A_{402}$. FET $Q_{405}$ is conductive whenever the transistor $Q_{404}$ is of which occurs when the voltage on capacitor $K_{405}$ is sufficient to hold the base of transistor $Q_{404}$ low. In these circumstances the zener diodes $D_{412}$ and $D_{413}$ determine the peak positive and negative excursion of the output of amplifier $A_{402}$ instead of the amplifier $A_{403}$. The resetting circuit of amplifier $A_{405}$ is identical and comprises a similarly connected FET $Q_{406}$, two zener diodes $D_{414}$ and $D_{415}$ and a resistor $R_{431}$.

The voltage on capacitor $K_{404}$ is limited by an external limiting circuit (not shown) to which it is connected via a PRO MAX terminal 414. A STOP/RUN terminal 416 is connected to the anode of a diode $D_{416}$ the cathode of which is connected to the cathode of a diode $D_{417}$ having its anode connected to the capacitor $K_{404}$. A constant current diode $D_{418}$ connects the cathodes of diodes $D_{416}$, $D_{417}$ to the −15 V rail. When the signal at the RUN/STOP terminal is low the capacitor $K_{404}$ discharges linearly to zero through the constant current diode $D_{418}$. When the signal at the RUN/STOP diode is high, capacitor $K_{404}$ can charge up vai resistor $R_{416}$ and diode $D_{403}$ from the output of amplifier $A_{403}$.

The circuit also includes a stall or slip detector which operates by comparing the phases of the voltage across and current in the winding 410, 411. This detector circuit includes an operational amplifier $A_{407}$ which has its non-inverting input grounded by resistor $R_{432}$ and its inverting input connected to the capacitor $K_{402}$ of the pulse width modulator circuit. This amplifier $A_{407}$ detects zero crossings in the average current waveform. Another operational amplifier $A_{408}$ has its inverting input grounded by a resistor $R_{433}$ and its non-inverting input connected by a resistor $R_{434}$ to the collector of the transistor $Q_{402}$, and by a capacitor $K_{407}$ in parallel with a variable resistor $R_{435}$ to ground. Resistor $R_{434}$ and capacitor $K_{407}$ operate as an averaging filter and variable resistor $R_{435}$ acts to provide phase compensation at higher speeds. Amplifier $A_{408}$ thus detects zero crossings in the averaged and phase compensated voltage waveform. The amplifier $A_{407}$ and $A_{408}$ have open-collector outputs and the output terminals of these are connected together and are connected by a resistor $R_{436}$ to the rail 412. These output terminals are also connected by a resistor $R_{437}$ to the inverting input of an amplifier $A_{409}$, such input also being connected by a capacitor $K_{408}$ to ground. The non-inverting input of amplifier $A_{409}$ is connected to a reference voltage source which supply a reference voltage representing the maximum torque which the motor can provide without slipping. The amplifiers $A_{407}$ and $A_{408}$ form a phase detector such that, when the voltage and current waveforms are exactly in phase one or other of the outputs is zero, thereby holding capacitor $K_{408}$ discharged. As the torque on the motor is increased the phase difference between the current and voltage waveforms increases so that for an increasing proportion of the time the outputs of both amplifiers $A_{407}$, $A_{408}$ are high simultaneously. Thus capacitor $K_{408}$ charges to a voltage which is dependent on the phase-shift, i.e. on the torque load on the motor.

The output of amplifier $A_{409}$ is connected to a SLIP/STALL terminal which may be connected to a stall indicator. In addition the output of amplifier $A_{409}$ is connected to the cathode of a diode $D_{419}$, the anode of which is connected by a resistor $R_{438}$ to the capacitor $K_{404}$.

In use, as mentioned above, when the signal at the STOP/RUN terminal 416 is low capacitor $K_{404}$ is held discharged so that neither integrator $A_{402}$ nor $A_{405}$ operates. When the signal at terminal 416 goes high the capacitor $K_{404}$ will start to change from which ever one of the amplifiers $A_{403}$, $A_{406}$ is producing a high output. The signal which is integrated by the amplifiers $A_{402}$, $A_{405}$ is thus initially small in magnitude and the rate at which the motor is stepped is therefore correspondingly slow. As the capacitor $K_{404}$ charges, however, the stepping rate increases until the maximum step rate determined by the transistor $Q_{404}$ is reached (or determined by the PRO MAX input if this is less.) The two waveforms produced are maintained 90° out of phase by the operation of amplifier $A_{406}$ and any drift which occurs in the integrating amplifier $A_{402}$, $A_{405}$ is dealt with automatically by clipping of the waveforms by operation of the resetting circuits referred to (unless the PRO MAX control is in use).

Should slip or stall occur the output of amplifier $A_{409}$ goes low, causing the capacitor $K_{404}$ to discharge through the resistor $R_{438}$ and the diode $D_{419}$, thereby reducing the stepping rate to aa level at which the output of amplifier $A_{409}$ goes high, whereupon capacitor $K_{404}$ will start to recharge.

In all of the circuits described above a waveform generator circuit provides a pair of substantially stepless symmetrical periodic waveforms which provide current demand signals to two pulse width modulation circuits driving the phase windings of the motor. Provision is made in every case for maintaining a phase difference of 90° (either a lead or a lag for forward/reverse control) between the waveforms and the step rate is variable either by changing the frequency of a clock signal in the case of the digital waveform generators, or by varying an analog signal which is integrated in the case of the analog waveform generators. In every case these measures provide smooth and accurate control of the stepper motor and permit running of the motor at higher stepping rates than are usually possible.

I claim:

1. A stepper motor control circuit responsive to a variable step rate demand signal, said circuit comprising a waveform generator circuit arranged to generate a pair of substantially stepless symmetrical periodic waveforms of constant amplitude and of frequency determined by said variable step rate demand signal received thereby, the waveforms being 90° out of phase, a pair of pulse width modulation circuits arranged to drive the motor windings, each modulation circuit receiving one of said waveforms as a current demand signal and a feedback signal related to the instantaneous current in the associated ones of the motor windings, wherein said waveform generator circuit is a triangular waveform generator circuit in which the slopes of the leading and trailing flanks of the waveform are equal during steady speed running of the motor.

2. A stepper motor control circuit as claimed in claim 1 in which the waveform generator circuit comprises a pair of digital counters clocked by the same clock pulses, a pair of digital-to-analog converters for converting the counter outputs to analog signals and means for resetting one counter at a specific point in the counting cycle of the other counter to maintain the desired 90° phase difference.

3. A stepper motor control circuit as claimed in claim 2 further comprising an amplifier ($A_{201}$, $A_{203}$) connected to a reference voltage output of the converter and an electronic switch ($S_1$, $S_2$) connected to be controlled by the MSB output of the associated counter and providing a switched connection between the analog output of the converter and the amplifier ($A_{201}$, $A_{203}$) whereby the latter acts as a voltage follower which the MSB output is in one state and as a unity gain inverter when the MSB output is in the other state.

4. A stepper motor control circuit as claimed in claim 1 in which the waveform generator comprises a pair of amplifiers connected as active integrators, signal storage means for storing equal magnitude signals of opposite polarity and connected to the amplifiers to provide the integrand inputs thereto and means sensitive to the output of one amplifier for resetting the other amplifier to maintain the 90° phase difference between the waveforms.

5. A stepper motor control circuit as claimed in claim 4 further comprising a phase-detector connected to the motor and providing an output indicative of the difference between the phases of the average voltage waveform applied to the motor and the average current waveform flowing in the motor, said phase detector comprising a means for reducing the signals stored in the signal storage means when the phase difference indicative signal exceeds a predetermined limit.

6. A stepper motor control circuit responsive to a variable step rate demand signal, said circuit comprising a waveform generator circuit arranged to generate a pair of substantially stepless symmetrical periodic waveforms of constant amplitude and of frequency determined by said variable step rate demand signal received thereby, the waveforms being 90° out of phase, a pair of pulse width modulation circuits arranged to drive the motor windings, each modulation circuit receiving one of said waveforms as a current demand signal and a feedback signal related to the instantaneous current in the associated ones of the motor windings, wherein each pulse width modulator has an output stage operating in push-pull between positive and negative supply rails at a frequency at least an order of magnitude higher than the maximum required stepping frequency.

7. A stepper motor control circuit as claimed in claim 6 in which the motor windings are connected in series with current sensing resistor means between the output stage and an earth return.

8. A stepper motor control circuit as claimed in 7 in which the output stage comprises a complementary pair of power FETs.

9. A stepper motor control circuit as claimed in claim 10 in which said power FETs are multi-cell FETs, e.g. HEXFETs.

10. A stepper motor control circuit as claimed in claim 7 in which the output stage comprises a complementary pair of bipolar transistors.

11. A stepper motor control circuit as claimed in claim 10 in which the pulse width modulator also comprises an operational amplifier having its power input terminals connected to the bases of the respective transistor and its output terminal connected by a load resistor to ground.

12. A stepper motor control circuit as claimed in claim 1 further comprising an input resistor connecting an output of the waveform generator circuit to the non-inverting input of the operational amplifier, a voltage feedback circuit connecting the output of the output stage to the non-inverting input of the operational amplifier, a current feedback resistor for connecting the current sensing resistor to the inverting input to the operational amplifier and a capacitor connecting the inverting input to the negative supply.

13. A stepper motor control circuit comprising a waveform generator circuit arranged to generate a pair of substantially stepless symmetrical periodic waveforms of constant amplitude and of frequency determined by a variable step rate demand signal received thereby, the waveforms being 90° out of phase, a pair of pulse width modulation circuits arranged to drive the motor windings, each modulation circuit receiving one of said waveforms as a current demand signal and a feedback signal related to the instantaneous current in the associated ones of the motor windings, a phase detector circuit connected to said modulation circuit and operating to provide a signal related to the difference between the phases of the voltage applied to and the current flowing in the motor, and means connected to said phase detector circuit and to said waveform generator circuit to reduce the frequency of the waveforms independently of said step rate demand signal when a predetermined out of phase condition is detected by said detector circuit.

14. A stepper motor control circuit as claimed in claim 13, in which said waveform generator circuit comprises a pair of amplifiers connected as active integrators, signal storage means for storing equal magnitude signals of opposite polarity and connected to the amplifiers to provide the integrand inputs thereto and means sensitive to the output of one amplifier for resetting the other amplifier to maintain the 90° phase difference between said waveforms.

15. A stepper motor control circuit as claimed in claim 14, further comprising a phase detector connected to the motor and providing an output indicative of the difference between the phases of the average voltage waveform provided to the motor and the average current waveform flowing in the motor, said phase detector comprising a means for reducing the signals stored in the signal storage means when the phase difference indicative signal exceeds a predetermined limit.

* * * * *